United States Patent
Mallary (10) Patent No.: US 7,289,302 B1
(45) Date of Patent: Oct. 30, 2007

(54) ON SLIDER INDUCTORS AND CAPACITORS TO REDUCE ELECTROSTATIC DISCHARGE DAMAGE

(75) Inventor: Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 452 days.

(21) Appl. No.: 10/253,763

(22) Filed: Sep. 24, 2002

Related U.S. Application Data (60) Provisional application No. 60/327,185, filed on Oct. 4, 2001.

(51) Int. Cl.
G11B 5/127 (2006.01)
(52) U.S. Cl. ...................................... 360/323
(58) Field of Classification Search ................ 360/323, 360/46, 244.1
See application file for complete search history.

(56) References Cited

U.S. PATENT DOCUMENTS

| | | | |
|---|---|---|---|
| 4,644,641 A | 2/1987 | Verdone | |
| 4,700,248 A | 10/1987 | Coughlin et al. | |
| 4,709,284 A | 11/1987 | Endo et al. | |
| 4,757,402 A | 7/1988 | Mo | |
| 4,761,699 A | 8/1988 | Ainslie et al. | |
| 4,803,578 A | 2/1989 | Fujiwara et al. | |
| 4,819,091 A | 4/1989 | Brezoczky et al. | |
| 4,870,619 A | 9/1989 | Van Ness | |
| 4,901,185 A | 2/1990 | Kubo et al. | |
| 4,926,274 A | 5/1990 | Saitoh et al. | |
| 4,939,603 A | 7/1990 | Inumochi | |
| 4,961,121 A | 10/1990 | Astheimer et al. | |
| 5,041,932 A | 8/1991 | Hamilton | |
| 5,063,712 A | 11/1991 | Hamilton et al. | |
| 5,064,271 A | 11/1991 | Kern et al. | |
| 5,065,271 A | 11/1991 | Matsuura et al. | |
| 5,111,351 A | 5/1992 | Hamilton | |
| 5,175,658 A | 12/1992 | Chang et al. | |
| 5,196,974 A | 3/1993 | Higashiya et al. | |
| 5,198,934 A | 3/1993 | Kubo et al. | |
| 5,251,081 A | 10/1993 | Cossette et al. | |
| 5,465,186 A * | 11/1995 | Bajorek et al. | ............. 360/323 |
| 5,488,524 A | 1/1996 | Cunningham | |
| 5,541,789 A | 7/1996 | Fukuoka et al. | |
| 5,748,412 A * | 5/1998 | Murdock et al. | ........... 360/323 |
| 5,757,590 A * | 5/1998 | Phipps et al. | ............... 360/323 |
| 6,084,743 A | 7/2000 | Comstock et al. | |
| 6,219,202 B1 * | 4/2001 | Palmer | .................... 360/234.5 |
| 6,233,127 B1 * | 5/2001 | Shimazawa | ................. 360/323 |
| 6,259,573 B1 * | 7/2001 | Tsuwako et al. | .............. 360/46 |
| 6,262,868 B1 * | 7/2001 | Arya et al. | ................ 360/290 |
| 6,324,031 B1 | 11/2001 | Comstock et al. | |
| 6,359,750 B1 * | 3/2002 | Hughbanks et al. | ........ 360/128 |

(Continued)

FOREIGN PATENT DOCUMENTS

JP 61-206917 9/1986

(Continued)

*Primary Examiner*—Allen Cao
(74) *Attorney, Agent, or Firm*—Cesari and McKenna, LLP (57) ABSTRACT

A slider for use in a magnetic disk drive includes read pads for connecting to a flexible circuit that couples to a pre-amplifier circuit, a transducer, and a protector connected to the transducer and the read pads to protect the transducer against damage from electrostatic discharge (ESD). Examples of transducers that may be used include a giant magnetoresistive (GMR) sensor and a tunneling magnetoresistive (TMR) sensor.

21 Claims, 11 Drawing Sheets

U.S. PATENT DOCUMENTS

| | | | |
|---|---|---|---|
| 6,373,660 B1 * | 4/2002 | Lam et al. | 360/234.5 |
| 6,459,343 B1 * | 10/2002 | Miller | 333/32 |
| 6,509,779 B2 * | 1/2003 | Yue et al. | 327/310 |
| 6,552,879 B2 * | 4/2003 | Voldman | 360/323 |
| 6,574,078 B1 * | 6/2003 | Voldman | 360/323 |
| 6,607,923 B2 * | 8/2003 | Carr et al. | 438/3 |
| 6,624,999 B1 * | 9/2003 | Johnson | 361/113 |
| 6,643,106 B2 * | 11/2003 | Bougtaghou et al. | 360/323 |
| 6,657,827 B1 * | 12/2003 | Fukuda et al. | 360/323 |
| 2002/0125931 A1 * | 9/2002 | Yue et al. | 327/310 |
| 2002/0176187 A1 * | 11/2002 | Bishop | 360/46 |
| 2004/0017640 A1 * | 1/2004 | Hughbanks et al. | 360/323 |
| 2004/0140860 A1 * | 7/2004 | Miller | 333/33 |

FOREIGN PATENT DOCUMENTS

| | | |
|---|---|---|
| JP | 64-19519 | 1/1989 |
| JP | 1-199364 | 8/1989 |
| JP | 1-298585 | 12/1989 |
| JP | 2-101688 | 4/1990 |
| JP | 2-239420 | 9/1990 |
| JP | 2-244419 | 9/1990 |
| JP | 2-304773 | 12/1990 |
| JP | 3-214478 | 9/1991 |
| JP | 4-76874 | 3/1992 |
| JP | 4-137212 | 5/1992 |

* cited by examiner

ON SLIDER INDUCTORS AND CAPACITORS TO REDUCE ELECTROSTATIC DISCHARGE DAMAGE

CROSS REFERENCE TO RELATED APPLICATIONS

This application claims priority from U.S. Provisional Patent Application Ser. No. 60/327,185, filed Oct. 4, 2001, which is incorporated herein by reference in its entirety for all purposes.

BACKGROUND

This invention relates to electrostatic discharge (ESD) protection in systems, such as magnetic disk drives.

One approach to providing ESD protection to ESD sensitive devices in magnetic disk drives, such as a giant magnetoresistive (GMR) sensor in a disk drive read head, involves the use of back-to-back diodes. If these diodes are located in a preamplifier circuit, as they typically are, there is no protection until the head gimbal assembly is completed. The protection at that point is marginal due to the high turn-on potential of the diodes, the high impedance of the turned-on diodes, and their remote location (at the opposite end of the flex circuit from the GMR sensor). Locating the diodes closer to the GMR sensor would only partly mitigate these problems, and would incur significant additional manufacturing cost to implement.

SUMMARY

In general, in one aspect, the invention is directed to a slider for a magnetic disk drive. The slider includes read pads for connecting to a flexible circuit that couples to a pre-amplifier circuit, a transducer and a protector connected to the transducer and the read pads to protect the transducer against damage from electrostatic discharge (ESD).

Particular implementations of the invention may provide one or more of the following advantages. The protector mechanism achieves ESD protection (from wafer process to drive utilization) without incurring excessive costs due to fabrication complexity. In particular, the use of "saturable" inductors that switch in and out by saturating in response to sense current or the ESD/EOS current provide protection without degrading read back performance.

The foregoing aspect of the invention may include one or more of the following features. The protector may be one or more inductors The transducer may be a magnetoresistive sensor having two leads, there may be two read pads, and there may be two inductors. The inductors may be connected in series with a different one of the leads of the magnetoresistive sensor and a different one of the read pads. Each of the inductors may saturate when a read sense current provided by the pre-amplifier circuit to the magnetoresistive sensor during a read operation flows into each inductor. Each of the inductors may have a high impedance value otherwise.

The transducer may be a magnetoresistive sensor. The one or more inductors may be one inductor connected in series with the magnetoresistive sensor. The inductor may not saturate. The protector may include a capacitor connected to at least one of the one or more inductors. The capacitor and the one or more inductors may form a series L-C-L network. The transducer may be a magnetoresistive sensor and the L-C-L network may be connected in parallel with the magnetoresistive sensor. The inductors in the L-C-L network may saturate at low ESD and electrical overstress (EOS) currents.

The one or more inductors may include first, second and third inductors. The first and second inductors may be connected in series with the magnetoresistive sensor and saturate in response to a read sense current provided to the magnetoresistive sensor during a read operation. The third inductor may be connected in series with the capacitor. The capacitor and the third inductor may be connected in parallel with the magnetoresistive sensor. The transducer may be one of a giant magnetoresistive (GMR) sensor and a tunneling magnetoresistive (TMR) sensor.

In general, in another aspect, the invention is directed to a magnetic disk drive, which includes a transducer and circuitry to protect the transducer from electrostatic discharge. The circuitry includes at least one inductor electrically connected to the transducer. This aspect may also include one or more of the following features.

The circuitry may include two inductors in series with the transducer. Inductances of each of the two inductors may vary with currents through each of the two inductors. The circuitry may include a capacitive-inductive circuit in parallel with the transducer. The capacitive-inductive circuit may include a first inductor in series with a capacitor in series with a second inductor. Inductances of the first and second inductors may vary with currents through the first and second inductors. The circuitry may include first and second inductors in series with the transducer, a third inductor in parallel with the transducer, and a capacitor in parallel with the transducer. The third inductor may be in series with the capacitor. An inductance of at least one of the inductors may vary with a current therethrough. The transducer may be one of a GMR or TMR sensor.

Other features and advantages of the invention will be apparent from the following detailed description, and from the claims.

BRIEF DESCRIPTION OF THE DRAWINGS

Like reference numerals in different figures indicate like elements.

DETAILED DESCRIPTION

This embodiment of the invention uses on-slider protectors, such as inductors and capacitors, to mute peak currents of Electrostatic Discharge ("ESD") events in a GMR sensor and to reduce damage associated with Electrical Overstress ("EOS"). The process for fabricating the inductors and capacitors is highly integrated with the standard transducer fabrication process so that there is little additional cost associated with use of the inductors and capacitors. ESD can occur during head (wafer) processing and during drive assembly. EOS typically occurs when there is capacitive or inductive coupling between writer and reader circuitry, yielding write current pulses in the reader.

Figure 1:
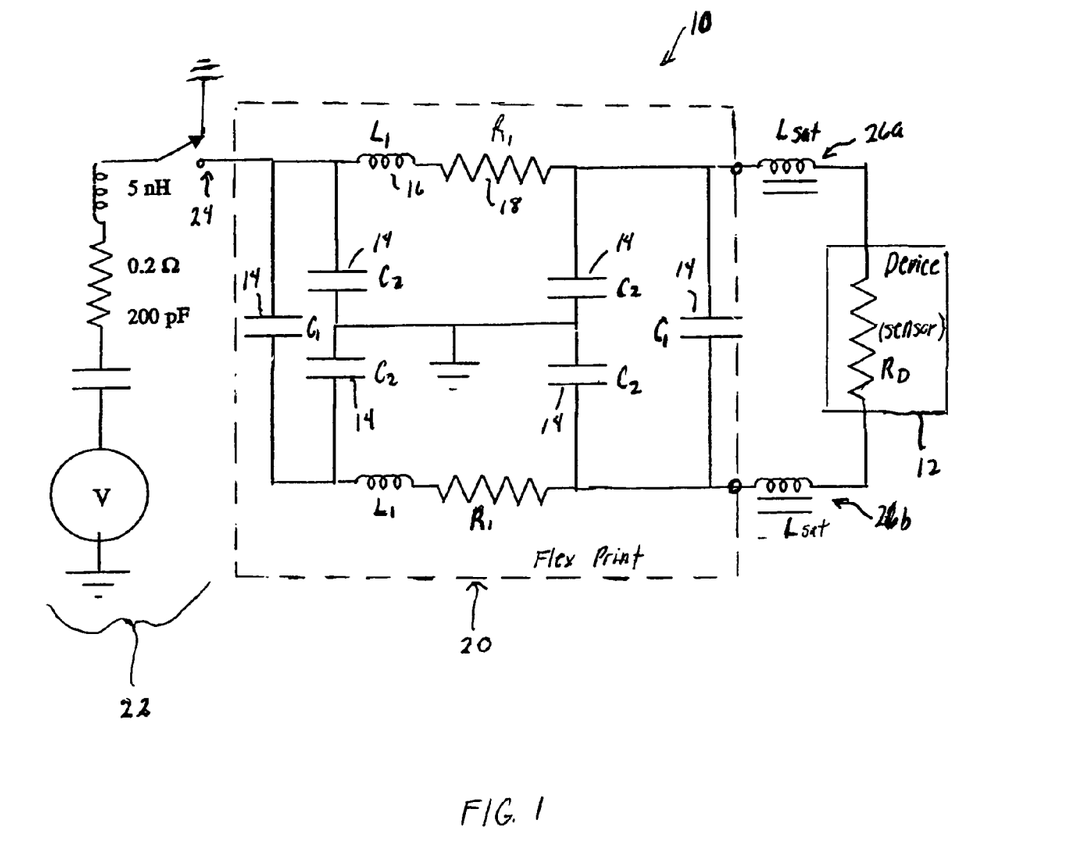
FIG. 1 is schematic diagram of a circuit that models ESD events in a device, such as a giant magnetoresistive (GMR) sensor, protected by protector circuitry in the form of a pair of saturable inductors connected in series with the GMR sensor.

Referring to FIG. 1, a circuit 10 configured to depict an ESD event in a device 12 is shown. In this embodiment, device 12 is a giant magnetoresistive (GMR) sensor or a tunneling magnetoresistive (TMR) sensor, modeled as a resistor $R_D$. Use of a GMR sensor will be assumed for the remainder of this description. Coupled to the GMR sensor is a portion of the circuit which models a flexible circuit board (or "flex print") 20. Flex print 20 includes a distribution of capacitors 14, inductors 16 and resistors 18.

To simulate an ESD event that might occur when one terminal of a pre-amplifier circuit is connected to the flex print 20 and the GMR sensor 12, a contact of a Machine Model source 22 is coupled to one of the flexible circuit terminals (terminal 24) when the other terminal is floating and the flexure body is grounded. Included in the circuit are nickel-iron inductors ($L_{sat}$) 26a and 26b, which are connected in series with device 12. In the absence of such inductors, current generated by the Machine Model source (or, in an actual disk drive assembly or operating environment, by a pre-amplifier circuit or "pre-amp") would flow through the GMR sensor ($R_D$) 12 and capacitors 14. If a terminal of source 22 that is connected to the device/flexure print and the pre-amp is already charged, a virtual capacitance to ground results. This virtual capacitance to ground causes current to flow through device 12 and each of capacitors 14. By adding the $L_{sat}$ inductors 26a and 26b as shown, more current flows through the capacitors 1.4 and is diverted from the device 12.

During operation, when a pre-amp is connected to a GMR sensor on a slider via the flexure print 20, the pre-amp provides a current during read back (read sense current) that is used to measure the GMR sensor resistance. The GMR sensor resistance varies in response to changes in magnetization on the disk. High impedance inductors placed in series with the GMR sensor and the pre-amp should not inhibit read back by preventing the GMR signal from flowing to the preamplifier. To avoid this problem, the $L_{sat}$ inductors 26a and 26b are designed to be "saturable" inductors. If an inductor is a saturable inductor, its inductance varies with current. The inductors 26a and 26b thus provide protection that does not interfere with reads. In this embodiment, the saturable inductors 26a and 26b are designed to saturate for the read sense current. Thus, during read back, the read sense current drives the inductance of the $L_{sat}$ inductors 26a and 26b down to a low value. Otherwise, when no sense current is applied to the GMR sensor (that is, when the GMR sensor is quiescent), e.g., during head or drive manufacture, or when operating the head during write mode with a write voltage that may be capacitively coupled to the reader (and thus the GMR sensor), the unsaturated, high inductance in series with the GMR sensor has a high impedance and thus prevents the GMR sensor from being damaged. The overload of current does not have to be that great, e.g., as little as 10 mA, even on a transitory basis, is enough to damage the GMR sensor. To achieve the controlled switching effect, then, the saturable inductors $L_{sat}$ 26a are 26b are designed to have relatively high inductance at relatively low current and relatively low inductance at relatively high current.

The saturable inductors in series with each GMR lead are saturated by the GMR sense current so that they do not degrade the read back process. This type of inductor provides protection from the wafer process throughout drive manufacture and product life. Protection during drive operation is provided during write mode.

In the embodiment of FIG. 1, the values of $C_1$ and $C_2$ are 0.5 pF and 2 pF, respectively, and values of $L_1$ and $R_1$ are 7 nH and 5 ohms ($\Omega$), respectively. A value of 50 nH is chosen for $L_{sat}$. Theses values are for illustrative purposes only.

Sample calculations indicate that a pair of 50 nH inductors (the $L_{sat}$ inductors) would reduce the peak current of an ESD event by 66% and the corresponding peak power by 88%. During a read back operation, the sense current would reduce the inductance of each inductor to the negligible value of 0.5 nH each. Therefore, there would be negligible impact on the read back signal. During the write process, the unsaturated inductors would increase the impedance of the GMR sensor by 600% to the 500 MHz transitions of the write pulse overshoot (EOS).

Figure 2A:
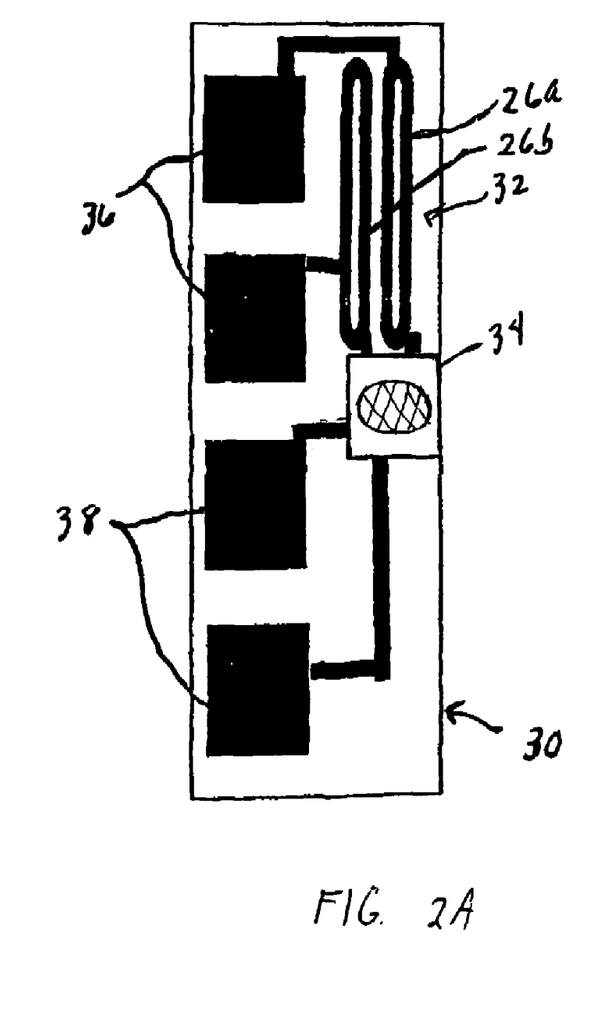
FIG. 2A is a plan view of a slider that employs the saturable series inductors shown in FIG. 1
Figure 2B:
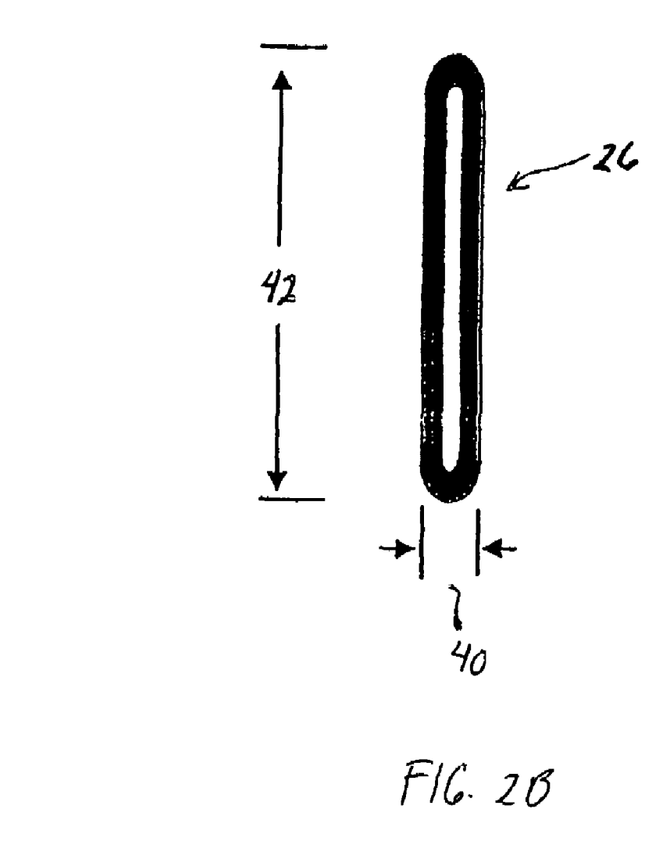
FIG. 2B is a plan view of the saturable inductor.
Figure 2C:
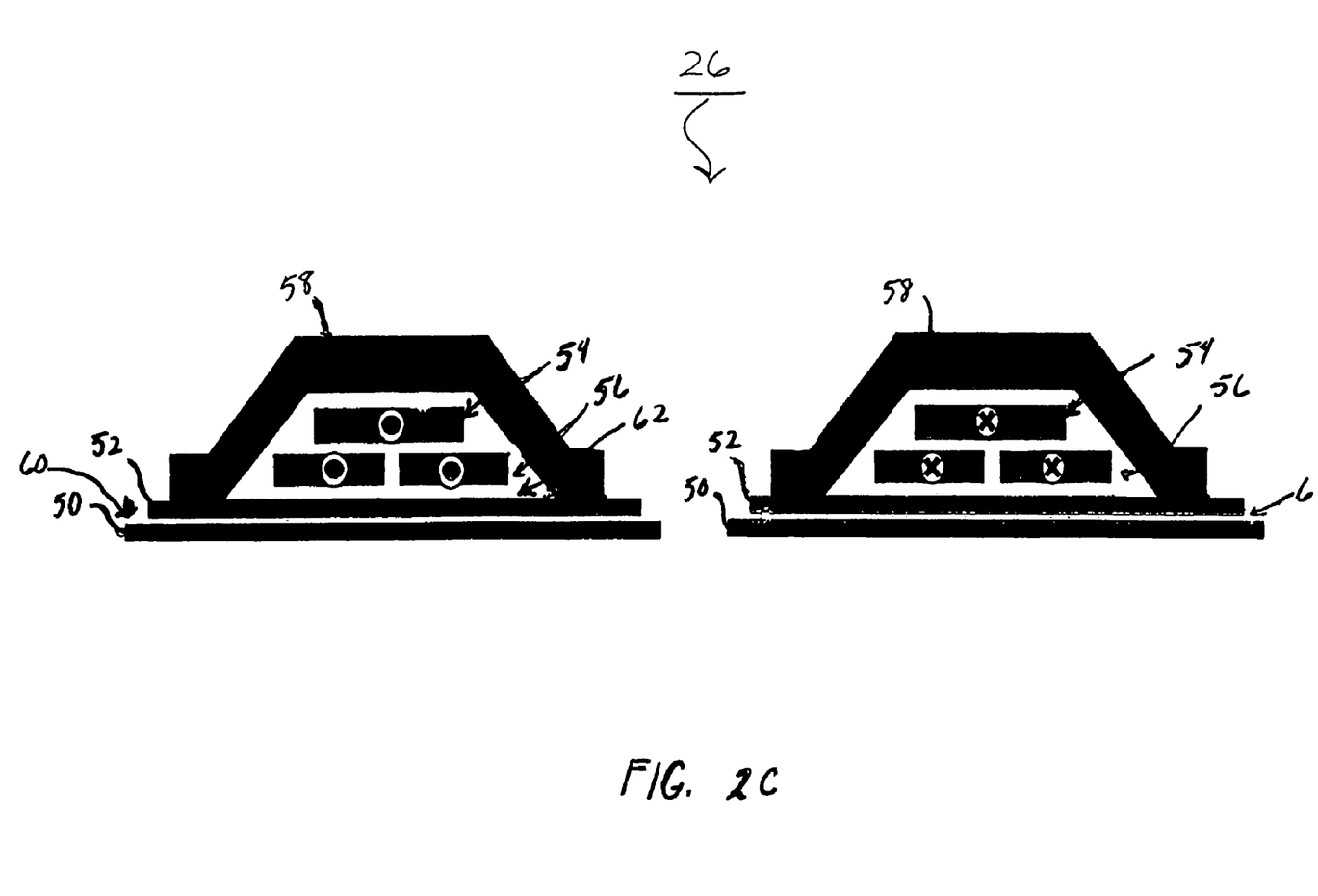
FIG. 2C is a cross-sectional side view of the saturable inductor.

A conceptual design for a similar, but larger, saturable inductor 26 is shown in FIGS. 2A-2C. FIG. 2A shows a plan view of a slider 30 that includes an ESD and/or EOS protector 32, shown as the arrangement of inductors 26a and 26b from FIG. 1. Inductors 26a and 26b are each connected in series with a transducer 34 (and more particularly, although not shown, with leads on the GMR sensor) and read pads 36. Transducer 34 is also connected to write pads 38. The read and write pads are used to connect to the flexure print (not shown). FIG. 2B illustrates a plan view of an inductor 26, which is shown as a race track coil, and which may comprise a saturable inductor 26a or 26b. In this example, the coil footprint has a width 40 of 50 µm (2 mils) and a length 42 of 300 µm (12 mils).

A cross-sectional side view of one $L_{sat}$ inductor 26 is shown in FIG. 2C. The structure shown in FIG. 2C is similar to that of an inductive write head. The $L_{sat}$ inductor can be fabricated during head processing at the same time as the write structures with little extra effort, since the same processing steps are needed for both.

As shown in FIG. 2C, inductor 26 is formed with a layering of bottom and top read shield layers 50 and 52, respectively, top and bottom coil 54 and 56, respectively, and top yoke 58. Layers 50 and 52 are called "read shields" because they are formed in the same process as the read shields of the GMR transducer. The read shields are, in fact, used as the bottom yoke of inductor 26. The read shield layers are spaced by a gap 60.

In this embodiment, the dimensions of $L_{sat}$ inductor 26 are as follows. Top yoke 58 has a thickness of 3 µm, top coil 54 has a thickness of 2 µm and a width of 11 µm, and bottom coil 56 has a thickness of 2 um and a width of 7 µm. A saturation zone 62 in the $L_{sat}$ inductor is 18 µm long. The top and bottom read shields each have a thickness of 1 µm. The thickness of the bottom and top read shields 50 and 52 are selected so that a DC current flowing through the inductor coil creates a saturation zone in these layers to drive the inductance down to a relatively low value. To create a saturation zone for high current values, e.g., so that saturation occurs at ~2 mA, the thickness of the bottom and top read shield layers 50 and 52 combined should be less than the thickness of top layer 58 (e.g., top layer may have a thickness of 3 µm and the combined (sum) thickness of the bottom and top read shield layers may be 0.5 µm to 1 µm). In the embodiment shown in FIG. 2C, the three turn yoke length is 18 µm long at the top-to-bottom junction.

The exemplary inductor depicted in FIGS. 2A-2C has calculated inductances of 900 nH DC, 250 nH at 500 MHz, and 2.5 nH for a DC current greater than 4 mA. The large inductance difference from DC to high frequency allows the inductor to remain unsaturated for current transients that are much greater than 4 mA (e.g., 16 mA at 500 MHz).

Another approach to the ESD/EOS problem observed in GMR sensor applications involves using a common mode inductor (both GMR sensor leads threaded in parallel through the yoke) instead of the saturable "series" inductors discussed earlier. The common mode type of inductor is not saturated by the read sense current so it can protect the GMR sensor from common mode ESD events during read back.

Figure 3A:
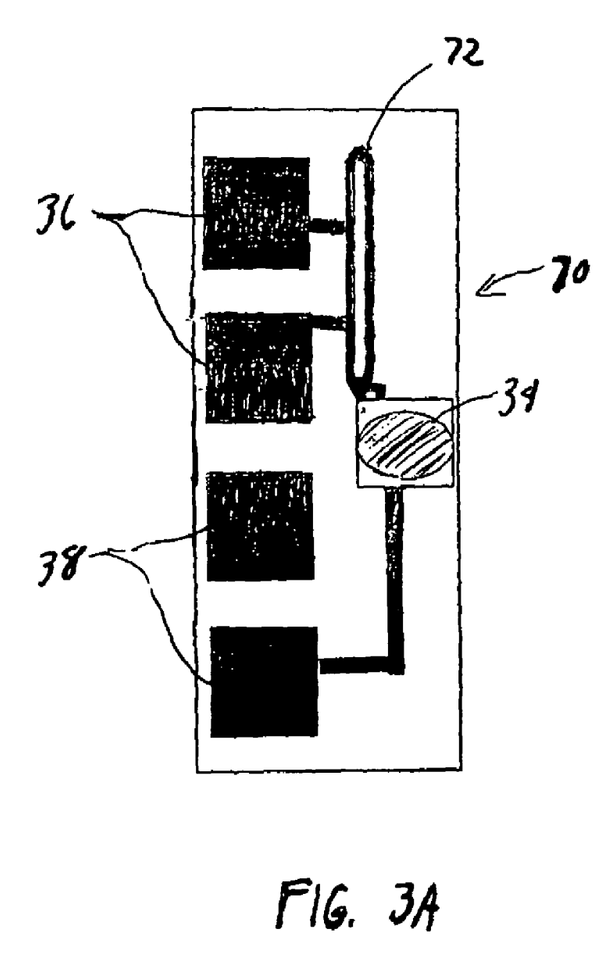
FIG. 3A is a plan view of a slider that employs a non-saturating common mode inductor connected in parallel with a GMR sensor.
Figure 3B:
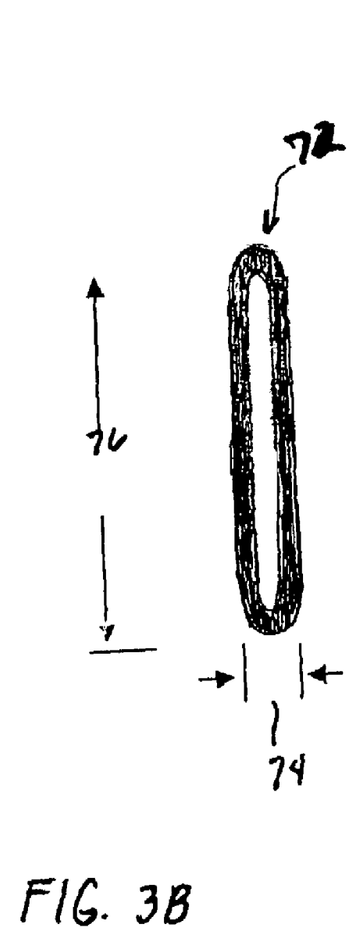
FIG. 3B is a plan view of the non-saturating common mode inductor.
Figure 3C:
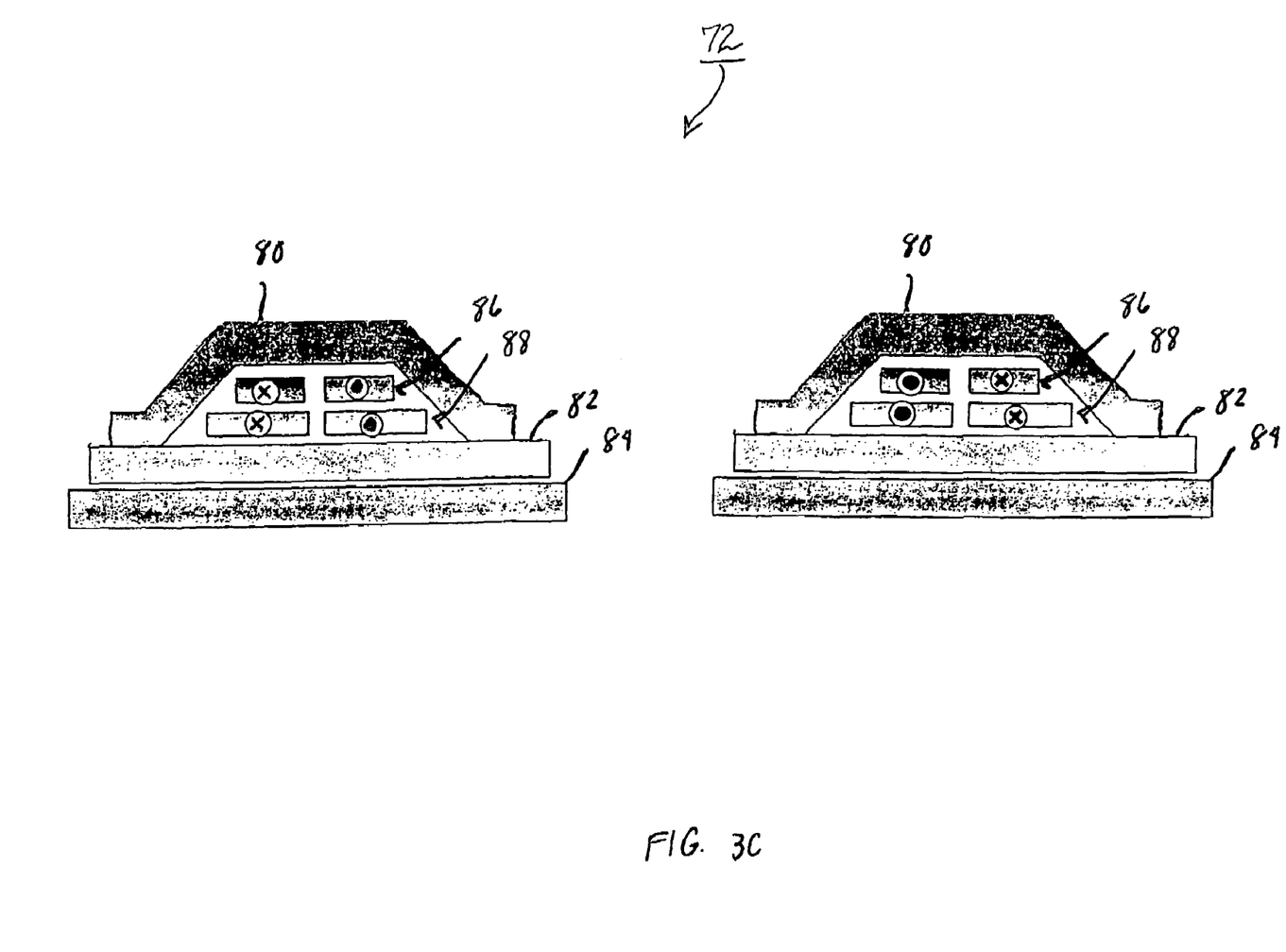
FIG. 3C is a cross-sectional side view of the non-saturating common mode inductor.

FIGS. 3A-3C show a design for an embodiment of a non-saturating common mode inductor. In the plan view of FIG. 3A, a slider 70 includes a common mode inductor 72 connected in series with the transducer 34 (GMR sensor) and read pads 36. FIG. 3B shows a plan view of the common mode inductor 72. Inductor 72 has a width 74 and thickness 76 of, for example, 50 µm and 300 µm, respectively. FIG. 3C shows cross-sectional side views of inductor 72. As shown, inductor 72 includes a top yoke 80 and top and bottom read shields 82 and 84, respectively. Inductor 72 also includes top and bottom coils 86 and 88, respectively. In one example, it is dimensioned as follows. The top yoke 80 has a thickness of 3.5 µm, the top coil 82 has a thickness of 2 µm and width of 11 µm, and the bottom coil 88 has a thickness of 2 µm and a width of 7 µm. The top and bottom shields each may have the full shield layer thickness (e.g., 3 µm) of each read shield layer.

The common mode inductor 72 may have two coil turns instead of three; accordingly, the 500 Mhz inductance is calculated to be about 80 nH. At a relatively lower frequency, the thicker shield layers add inductance. Therefore, the low frequency inductance is about 500 nH.

As noted earlier, common mode inductor 72 may be active during read back so as to provide protection against media-to-head discharges at all times. For added protection against the kind of imbalanced discharge depicted in FIG. 1, the common mode inductor 72 may be used in combination with saturable series inductor(s).

The process used to fabricate the transducer includes steps that are used in forming the saturable and non-saturable inductors. Because the shield layers defining the saturation zone 62 are thinner than that of a write head structure, the shield layers may require special processing. Processing techniques such as "double expose develop" can reduce any special efforts needed to achieve the two different thicknesses.

Figure 4:
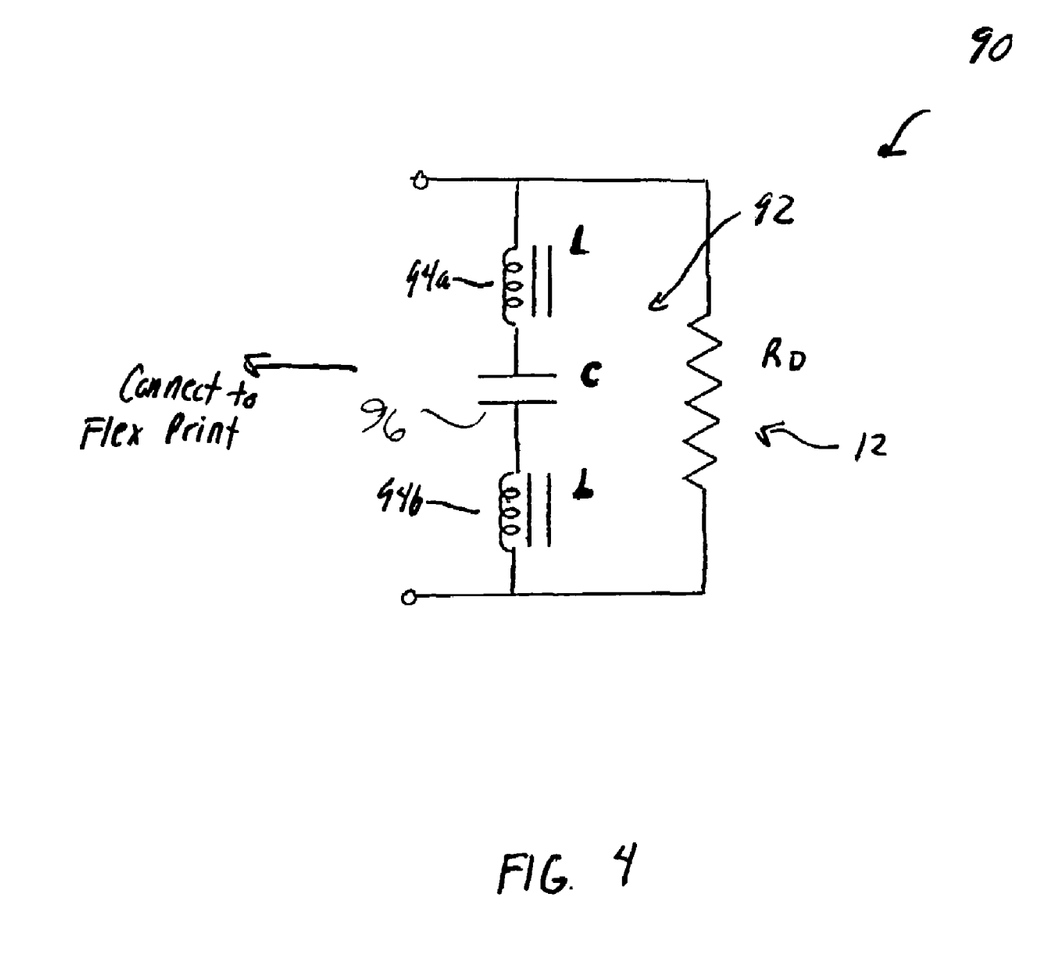
FIG. 4 is a schematic diagram of circuitry that provides an inductor-capacitor-inductor (L-C-L) network in parallel with a GMR sensor.

FIG. 4 illustrates other circuitry which provides ESD/EOS protection. This circuitry 90 includes a series L-C-L network 92. L-C-L network 92 includes a pair of saturable inductors 94a and 94b in series with a capacitor C 96, all of which is in parallel with GMR sensor 12 ($R_D$). Circuitry 90 connects to flex print 20 (from FIG. 1), thereby replacing the series inductors arrangement with L-C-L network 92. This approach protects against most ESD/EOS events if the inductors 94 are designed to saturate at low ESD currents. Assuming a value of 70 pF for C, the inductance values in this example are 160 nH each at 500 MHz and 250 nH at low frequencies. The total series resistance is about 5Ω. Saturation occurs for currents greater than 0.5 mA (at 500 MHz) in this example, and reduces the inductance values to about 3 nH for each inductor. Such a current may be achieved in the first half-nanosecond of an ESD event that spiked current in the GMR to 8 mA. This current would be a short term (e.g., seconds) reliability problem if it were on all the time, but the temperature rise for this short a transient is estimated to be less than 30% of the DC temperature rise.

The resonant frequency of the circuit shown in FIG. 4 is 27 MHz. Therefore, the circuit may induce some signal distortion. However, at intermediate frequencies (e.g., the total inductance, $L_{tot}$=370 nH at 200 MHz), the impedance of the inductors is about 470Ω, so the impact on the signal should be small. A higher inductance and a lower resonant frequency can easily be obtained by increasing the thickness of the high permeability (e.g., µ=5000) shield seed layers in the inductors. This increases the time required to reach saturation and the current at saturation.

Figure 5A:
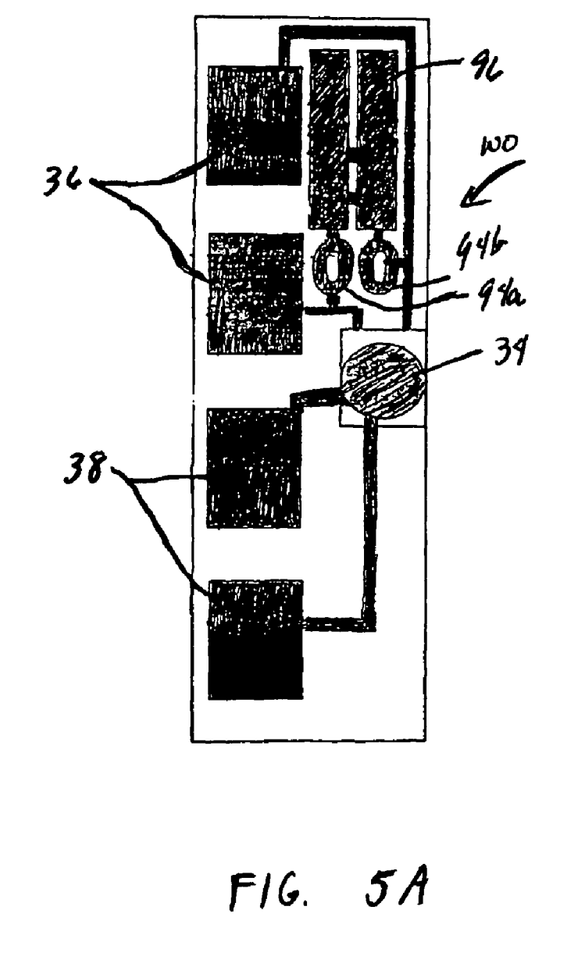
FIG. 5A is a plan view of a slider that employs the L-C-L network connected in parallel with a GMR sensor.
Figure 5B:
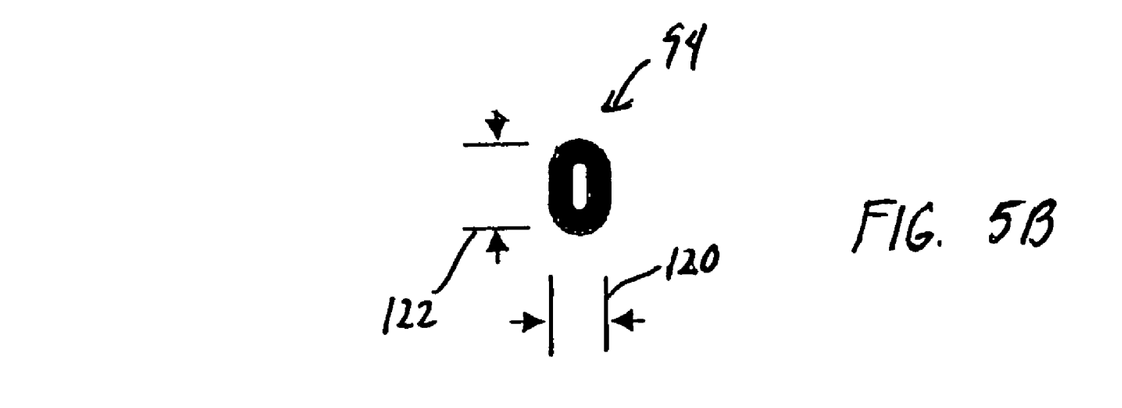
FIG. 5B is a plan view of the inductor of the L-C-L network.
Figure 5C:
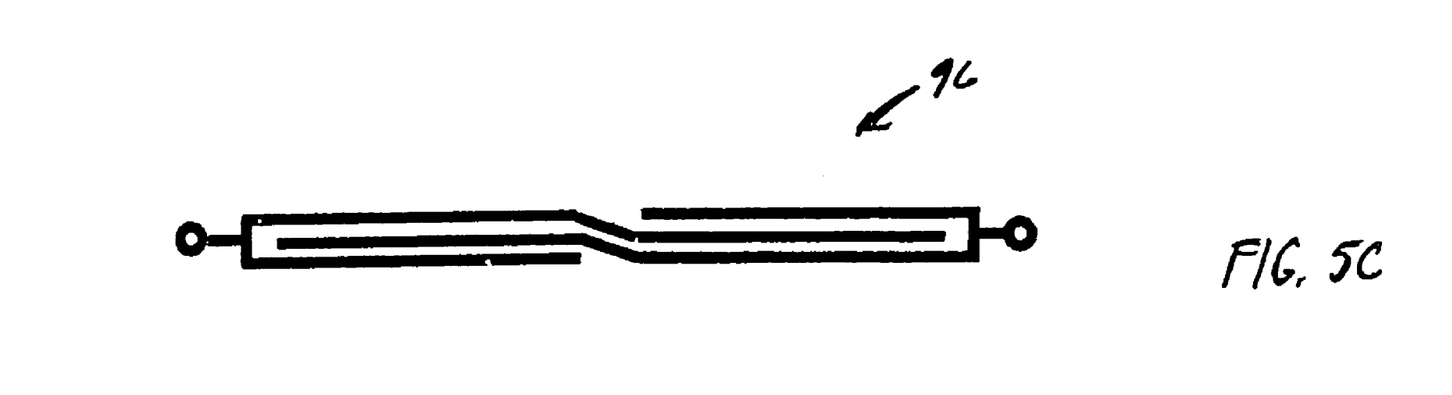
FIG. 5C is a cross-sectional view of the capacitor of the L-C-L network.

FIG. 5A shows a plan view of a slider 100 that includes inductors 94a and 94b in series with capacitor 96. FIG. 5A also shows network 92 connected in parallel with transducer 34 (GMR sensor) and read pads 36. FIG. 5B shows a plan view of inductor 94 and FIG. 5C shows a cross-sectional view of capacitor 96. An exemplary footprint for the inductor 94 has a width 120 of 50 µm and a length 122 of 75 µm.

Figure 5D:
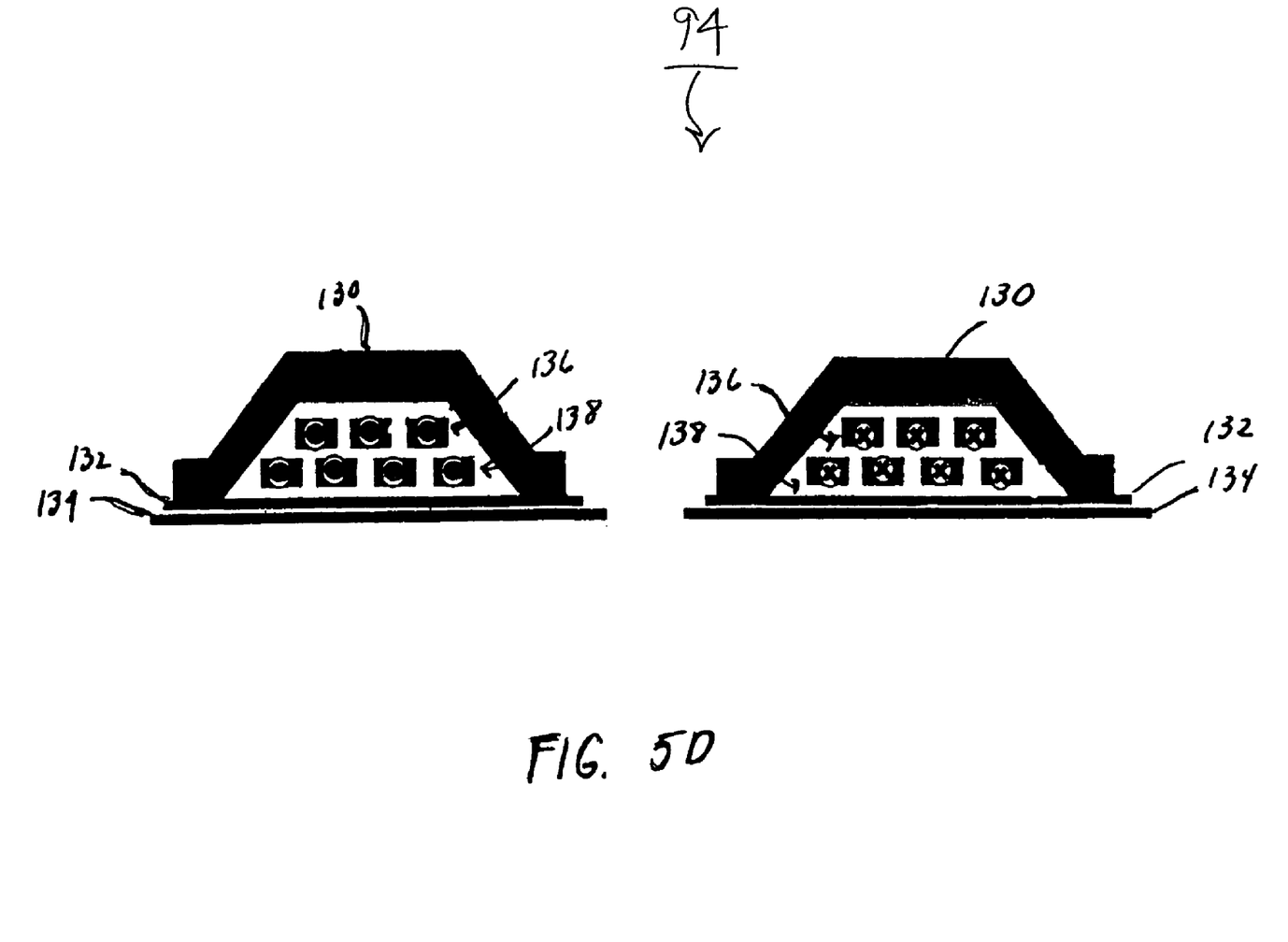
FIG. 5D is a cross-sectional side view of L-C-L network inductors.

FIG. 5D shows a cross-sectional side view of inductor 94. As shown, inductor 94 includes a top yoke 130, and top and bottom shields 132 and 134, respectively. Inductor 94 also includes top and bottom coils 136 and 138, respectively. In one embodiment, the inductor 94 is dimensioned as follows. Top yoke 130 has a thickness of 3 µm, top coil 136 has a thickness of 2 µm and width of 3.5 µm, and bottom coil 138 has a thickness of 2 µm and a width of 3.5 µm. The saturation zone is 18 µm long.

Compared to the other two approaches, the L-C-L design illustrated in FIGS. 4 and 5A-5C may require more wafer process modification to produce. The main differences are related to the fabrication of the capacitor 96. The insulation layer is somewhat thinner (e.g., 15 nm versus 20 nm) than the standard gap layers (e.g., 20 nm) so additional process steps may be needed.

Figure 6:
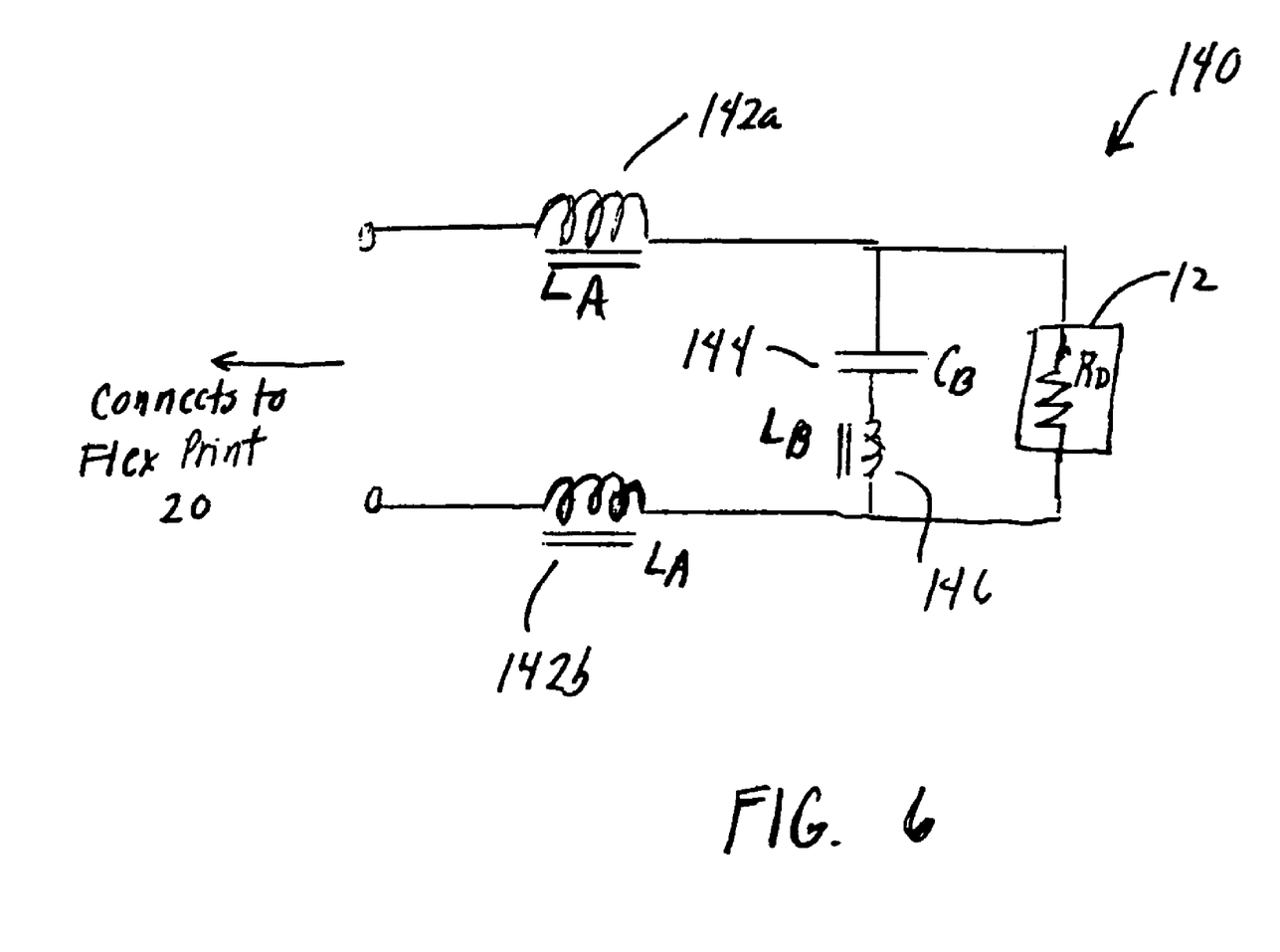
FIG. 6 is a schematic of circuitry coupling, to a GMR sensor, a pair of saturable series inductors and a parallel network having a saturable inductor and a capacitor.

FIG. 6 shows other protector circuitry 140 that uses a mix of saturable inductors and capacitors. Circuitry 140 adds two saturable series inductors 142a and 142b, indicated also as $L_A$, a capacitor $C_B$ 144, and a saturable inductor $L_B$ 146 connected in parallel with device 12. The $L_A$ inductors 142 operate as described above with respect to FIG. 1. The $L_B$ inductor 146 is varied by ESD current, not read sense current. Thus, during read mode, $L_A$ 142 saturates, but $L_B$ 146 remains at full value (as C 144 blocks the read sense current). Inductor $L_B$ 146 is designed to saturate when high voltage (on the order of volts, much larger than read back voltage which is typically about 1 mV) is applied, and can shunt the discharge current to the capacitor C 144. The $L_B$ inductor 146 may require a thinner bottom layer than $L_A$ 142, for example, 0.1 µm ($L_B$) instead of 1 µm ($L_A$).

The various approaches described herein can be used separately or together depending on considerations of read performance (degradation), degree of ESD/EOS protection, and wafer processing complexity.

Figure 7:
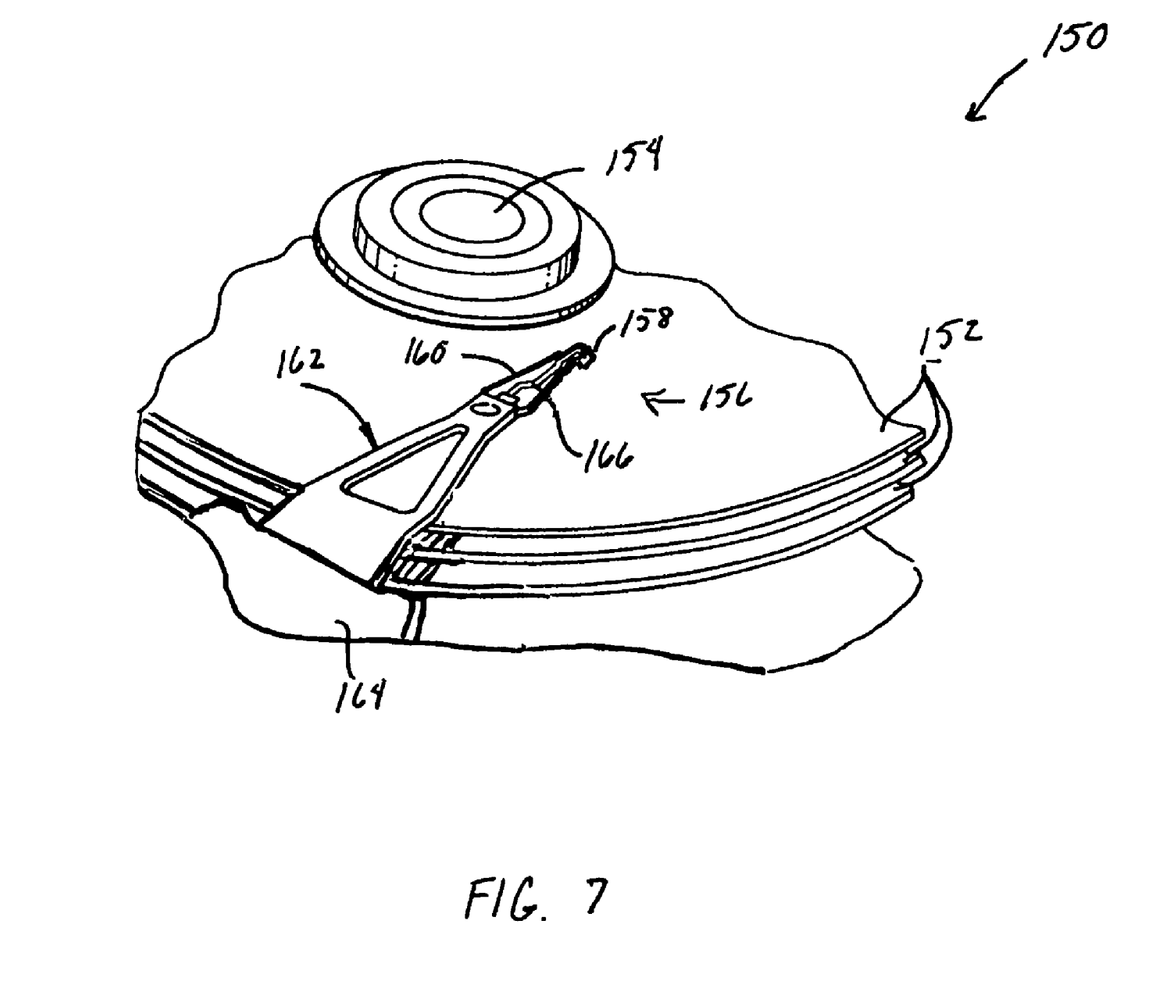
FIG. 7 is a partial perspective view of a disk drive system.

FIG. 7 shows a disk drive system 150. System 150 includes one or more magnetic disks 152 rotated by spindle motor 154. Magnetic disks 152 rotate relative to head gimbal assemblies (HGA) 156. Each HGA includes a slider 158 mounted to a suspension arm 160. The suspension arm 160 is attached to an actuator arm 162. The head arms are moved around the surface of the disk by an actuator 164. Each HGA may have a flex print 166 that is mounted to the suspension arm 160 and electrically connects the head on the slider 158 to a pre-amplifier circuit (not shown). The slider 158 includes a protector, that is, one or more of the above-described protection mechanisms, to protect the components in the head, in particular, the magnetoresistive (e.g., GMR or TMR) sensor, from damage as a result of ESD and/or EOS.

Other embodiments not described herein are also within the scope of the following claims.

What is claimed is:

1. A slider for use in a magnetic disk drive, comprising:
   read pads for connecting to a flexible circuit that couples to a pre-amplifier circuit;
   a transducer; and
   a protector, including one or more saturable inductors, connected to the transducer and the read pads to protect the transducer against damage from electrostatic discharge (ESD).

2. The slider of claim 1, wherein the transducer comprises a magnetoresistive sensor, and wherein the one or more saturable inductors comprises one saturable inductor connected in series with the magnetoresistive sensor.

3. The slider of claim 1, wherein the protector further comprises a capacitor connected to at least one of the one or more saturable inductors.

4. The slider of claim 3, wherein the one or more inductors comprise first, second and third inductors, the first and second inductors being connected in series with the magnetoresistive sensor and saturating in response to a read sense current provided to the magnetoresistive sensor during a read operation.

5. The slider of claim 4, wherein the third inductor is connected in series with the capacitor, the capacitor and third inductor being connected in parallel with the magnetoresistive sensor.

6. The slider of claim 1, wherein the transducer comprises one of a giant magnetoresistive (GMR) sensor and a tunneling magnetoresistive (TMR) sensor.

7. A slider for use in a magnetic disk drive, comprising:
   read pads for connecting to a flexible circuit that couples to a pre-amplifier circuit;
   a transducer, and
   a protector, including one or more inductors, connected to the transducer and the read pads to protect the transducer against damage from electrostatic discharge (ESD) wherein the transducer comprises a magnetoresistive sensor having two leads, the read pads comprise two read pads, and the one or more inductors comprises two inductors, each connected in series with a different one of the leads of the magnetoresistive sensor and a different one of the read pads.

8. The slider of claim 7, wherein each of the inductors saturates when a read sense current provided by the pre-amplifier circuit to the magnetoresistive sensor during a read operation flows into each inductor, and has a high impedance value otherwise.

9. A slider for use in a magnetic disk drive, comprising:
   read pads for connecting to a flexible circuit that couples to a pre-amplifier circuit;
   a transducer; and
   a protector, including one or more inductors, connected to the transducer and the read pads to protect the transducer against damage from electrostatic discharge (ESD) wherein the protector further comprises a capacitor connected to at least one of the one or more inductors, and wherein the capacitor and the one or more inductors form a series L-C-L network.

10. The slider of claim 9, wherein the transducer comprises a magnetoresistive sensor and the L-C-L network is connected in parallel with the magnetoresistive sensor.

11. The slider of claim 10, wherein the inductors in the L-C-L network saturate at low ESD and electrical overstress (EOS) currents.

12. A magnetic disk drive, comprising:
   a transducer; and
   a circuit coupled to the transducer to protect the transducer from electrostatic discharge, the circuit comprising at least one saturable inductor electrically connected to the transducer.

13. The magnetic disk drive of claim 12, wherein the circuit comprises two saturable inductors in series with the transducer.

14. The magnetic disk drive of claim 13, wherein inductances of each of the two inductors vary with currents through each of the two inductors.

15. The magnetic disk drive of claim 12, wherein the transducer comprises one of a giant magnetoresistive (GMR) sensor and a tunneling magnetoresistive (TMR) sensor.

16. A magnetic disk drive, comprising:
   a transducer; and
   a circuit coupled to the transducer to protect the transducer from electrostatic discharge, the circuit comprising at least one inductor electrically connected to the transducer wherein the circuit comprises a capacitive-inductive circuit in parallel with the transducer.

17. The magnetic disk drive of claim 16, wherein the capacitive-inductive circuit comprises a first inductor in series with a capacitor in series with a second inductor.

18. The magnetic disk drive of claim 17, wherein inductances of the first and second inductors vary with currents through the first and second inductors.

19. A magnetic disk drive, comprising:
   a transducer; and
   a circuit coupled to the transducer to protect the transducer from electrostatic discharge, the circuit comprising at least one inductor electrically connected to the transducer, wherein the circuit comprises:
   first and second inductors in series with the transducer;
   a third inductor in parallel with the transducer; and
   a capacitor in parallel with the transducer.

20. The magnetic disk drive of claim 19, wherein the third inductor is in series with the capacitor.

21. The magnetic disk drive of claim 19, wherein an inductance of at least one of the first, second and third inductors varies with a current therethrough.

* * * * *